United States Patent [19]

Parker et al.

[11] 4,403,004

[45] Sep. 6, 1983

[54] SANDWICH METALIZED RESIN LAMINATE

[75] Inventors: Harry A. Parker, Murray Hill; Joseph Greenman, Plainfield, both of N.J.

[73] Assignee: Transfer Print Foils, Inc., East Brunswick, N.J.

[21] Appl. No.: 314,314

[22] Filed: Oct. 23, 1981

[51] Int. Cl.[3] .................... B60R 13/00; B29C 19/00; C09J 7/02

[52] U.S. Cl. .................................. 428/31; 156/243; 156/244.27; 428/332; 428/335; 428/337; 428/339; 428/343; 428/347; 428/913; 428/914

[58] Field of Search ................ 428/31, 343, 335, 337, 428/347, 339, 421, 463, 913, 914; 156/244.27, 243

[56] References Cited

U.S. PATENT DOCUMENTS 3,152,950 10/1964 Palmquist et al. ................ 428/335
3,720,567 3/1973 Shanok et al. ...................... 428/31
3,811,989 5/1974 Hearn ........................ 156/244.27 X
4,101,698 7/1978 Dunning et al. ..................... 428/31
4,235,949 11/1980 Van Manen et al. ................ 428/31
4,275,099 6/1981 Dani .................................... 428/31

*Primary Examiner*—Thomas J. Herbert, Jr.
*Attorney, Agent, or Firm*—David A. Jackson; Daniel H. Bobis

[57] ABSTRACT

A decorative metallized laminate having improved brilliance, reflectance and weatherability comprises a base layer prepared from a thermo-formable resin film, with both surfaces thereof coated with vapor deposited metal layers. An outer protective capping layer prepared from a film having at least one surface treated for receptivity to adhesive bonding and resistance to attack by ultra-violet radiation, is adhesively bonded to one of the metallized surfaces of the base layer. A pressure and heat sensitive elastomeric adhesive coating is disposed between the capping layer and the metallized surface of the base layer, to form the bond between the two layers. A compatible thermo-formable resin backing layer may be laminated to the free metallized surface of the base layer, to provide a composite laminate suitable for thermo-forming and injection molding to manufacture a variety of products.

A method for preparing the metallized laminate is also disclosed.

18 Claims, 4 Drawing Figures

SANDWICH METALIZED RESIN LAMINATE

BACKGROUND OF THE INVENTION

1. Field of the Invention

The present invention relates to reflective decorative laminates, and more particularly to such laminates as are useful in applications requiring exposure to mechanical stress and environmental extremes.

2. Description of the Prior Art

A variety of decorative, reflective laminates prepared with a variety of resin materials, have been developed and in existence for some time. With the increasing concern for safety and weight reduction, that has developed in the automotive industry, for example, the use of such reflective laminates in place of reflective articles prepared entirely from metal, has been on the increase. Thus, structures such as bumpers, side trim, grill work and the like, previously prepared from relatively rigid and heavier chromium-plated metals, are being replaced by the lighter weight resinous materials.

While wide-spread employment of resinous materials exists, their use has been primarily in the instance where pigmented non-reflective hardware such as bumpers, and the like, is acceptable in the design of the vehicle. In those instances where reflective surfaces are desired, however, the manufacturers tend to continue their use of the conventional plated metal, because they find that the reflective surfaces prepared from resinous laminates tend to be of inferior brightness and reflectivity, and frequently exhibit surface defects when exposed to mechanical impact, as well as deterioration of the metallic layer after relatively short exposure to atmospheric air and sunlight.

A variety of laminates specifically designed for automotive application have been developed, all of which have attempted to remedy the aforementioned deficiencies, by providing, in pertinent part, a reflective metal layer, usually vapor deposited upon a transparent resin film, with the resulting metal coated film bonded adhesively to one or more further resin films, so that the metal layer is presumably securely disposed within the resulting laminates. Variations on this construction are illustrated in the following U.S. Pat. Nos. 4,275,099; 4,235,949; 4,101,698; 3,811,989; and 3,720,567. Naturally, the foregoing listing is illustrative only, as other patents, and related publications illustrate yet further variations in construction and preparation of such laminates.

Of the patents listed, U.S. Pat. No. 4,275,099 to Dani is of particular interest, as it discloses in its general discussion, a laminate construction that is presently popular, that of the tri-laminate. Dani describes this construction as essentially three-ply, constituted of an aluminized polyester film, adhesively bonded to outer polyvinylfluoride film and bonded on its opposite side to a base layer of what patentee terms a "virgin vinyl resin." The patentee states further, that the tri-laminate maybe either heat fused or otherwise adhesively bonded to a three dimensional extrusion, to form products such as automotive trim strips and the like.

The deficiencies of this state of the art construction are also noted by Dani, in that patentee remarks that the laminated products tend to delaminate in use after relatively short exposure to outside environments. Dani notes that delamination frequently occurs at the adhesive interface between the metallized surface and the next adjacent resin film, and proposes a specific adhesive formulation that purportedly remedies this defect.

In addition to those deficiencies noted by Dani, the present inventors found that the commercial production of the known tri-laminates was exceeding difficult if not impossible, when attempts were made to adapt these tri-laminates to the preparation of automotive accessories by thermo forming techniques. Thus, it was observed that when the temperatures of the thermo forming operation fluctuated outside illustrative tolerances of about 5° F., the resulting products exhibited surface crazing, the development of a haze in the resin films that reduced brightness and reflectivity, and an effect known as "rainbow," i.e., a multi-color hue that appears due to the distortion of the polyester film during the thermo forming process. Further, the appearance of any of the foregoing defects would result in the rejection by automobile manufacturers of products having these defects.

A further problem, noted by Dani, and others in the art, comprises the susceptibility of the resin laminate to attack and rapid deterioration upon exposure to ultraviolet light. Dani proposes to include an ultra-violet inhibitor in the polyester film to remedy this defect. The present inventors have found, however, that the adhesive utilized in the laminates presently known, have generally low resistance to deterioration from exposure to ultra-violet light, and therefore fail within an unacceptably short period of time after their installation. Further, the prior art adhesives appear to attack the adjacent metal layer and to cause it to corrode, with the result that desired appearance and laminate integrity rapidly deteriorate.

A need therefore exists for the development of an improved laminate and associated method of preparation that can efficiently and economically cure the noted product deficiencies.

SUMMARY OF THE INVENTION

In accordance with the present invention, a decorative metallized laminate exhibiting improved brilliance, reflectance and weatherability is disclosed which comprises a base layer prepared from a thermo formable resin film having both surfaces thereof coated with a thin, adherent layer of metal, and an outer, protective capping layer prepared from a film having at least one surface treated for receptivity to adhesive bonding and resistance to attack by ultra-violet radiation, the capping layer adhesively bonded to one of the metallized surfaces of the base layer. A pressure and heat sensitive elastomeric adhesive coating, also resistant to attack by ultra-violet radiation and harmless to the metal layers, is disposed between the capping layer and the metallized surface of the base layer, and forms the bond therebetween. The present laminate maybe bonded to a compatable thermo-formable resin backing layer that may be laminated to the free metallized surface of the base layer.

The base layer is a non-oriented resin film prepared from material selected from the group consisting of amorphous polyester resins, polycarbonate resins, substituted and unsubstituted vinyl polymers, and their co-polymers. Preferably, the non-oriented resin comprises an amorphous polyester, such as polyethylene terephthalate and ranges in thickness from about 3 to about 8 mils. The metal layers may be applied by conventional techniques, such as vapor deposition, and may include chromium, nickel, iron, aluminum, and others, with aluminum preferred.

The capping layer may be a material selected from the group consisting of fluorinated vinyl polymers, fluorinated polyolefins, and polyesters treated for resistance to ultra-violet radiation. Preferably, the capping layer comprises a polyvinylfluoride.

The adhesive coating maybe a silicone resin or an acrylic resin, and preferably includes a catalyst in amount ranging from about 2% to about 6% by weight of the resin solids of the adhesive. Preferrably, the adhesive is a silicone resin such as a substituted polysiloxane, and the catalyst is a silicone compound as well.

The present invention includes a method for preparing the decorative metallic laminate, comprising the steps of applying the metal layer to one surface of the base layer, adhesively bonding the capping layer to the metallized surface of the base layer and thereafter metallizing the free surface of the base layer. The resulting laminate may then be bonded by standard laminating techniques, such as extrusion lamination, to a backing layer of a thermo-formable resinous material. The resulting laminate may be extrusion molded to a preformed substrate or maybe formed into a three dimensional article by injection molding with additional resinous material adhesively compatible with the composition of the backing layer. Such resinous material may include various known polyolefins, vinyl compounds such as polyvinylchloride, and others.

The present laminates are particularly useful in the instance where automotive products for exterior exposure are prepared, as the combined inertness of the adhesive and the ultra-violet resistance of both the adhesive and the capping layer, substantially extend the useful life of the laminate surface, to resist ultra-violet radiation, chemical attack from the environment, and resistance to fracture from mechanical impact. The presence of the catalyst in the adhesive of the present laminate, promotes the formation of a firm bond between the capping layer and the underlying base layer, that resists surface defect formation and delamination during subsequent thermo-forming operations, and provides improved transparency that enhances the brilliance and reflectivity of the metal layer.

Finally, the provision of the sandwich of metallized surfaces surrounding the base layer, totally eliminates the "rainbow" effect that can result from the deformation of the base layer during thermo-forming, as the two layers cooperate to provide a continuous surface regardless of the extent to which the base layer may be deformed in susequent manufacturing procedures.

The present product is easily and inexpensively prepared without resorting to rigorous processing. Product uniformity is substantially improved so that the reject rate for formed parts drop well within commercially acceptable tolerances.

Accordingly, it is a principal object of the present invention to provide a decorative metallized laminate exhibiting improved brilliance, reflectance and weatherability, that is capable of successfully undergoing thermo-forming operations.

It is a yet further object of the present invention to provide a laminate as aforesaid, which eliminates the frequency of surface defects, loss of reflectance and breakdown of the metal layer upon exposure to ultraviolet light.

It is a yet further object of the present invention to provide a laminate as aforesaid that is particularly useful for the formation of exterior automotive parts.

It is a yet further object of the present invention to provide a method for preparing a bright, metallized laminate, that is simply and inexpensively practiced without resorting to rigorous conditions.

It is a yet further object of the present invention to provide a method as aforesaid, forms a laminate product capable of successfully undergoing subsequent thermoforming operation.

Other objects and advantages will become apparent to those skilled in the art from a consideration of the ensuing description, which proceeds with reference to the following illustrative drawings.

DETAILED DESCRIPTION

Figure 1:
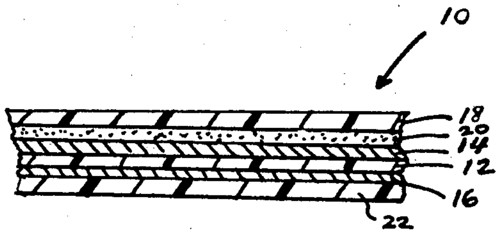
FIG. 1 is a schematic fragmentary sectional view of a laminate in accordance with the present invention.

Referring to FIG. 1, the decorative laminate 10 is illustrated schematically and comprises a base layer 12 that is prepared from a thermo formable resin film. The base layer 12 is preferably prepared from a non-oriented film selected from the group consisting of amorphous polyester resins, polycarbonate resins, substituted and unsubstituted vinyl polymers, and their copolymers. More particularly, the amphorous polyesters may include polyethylene terephthalate, the polycarbonates may include acrylonitrile-butadiene-styrene resins, the vinyl polymers may include polyvinylchloride homo- or copolymers as well as other commercially available vacuum formable or thermo-formable materials.

A preferred material for base layer 12 comprises a polyethylene terephthalate sold by Allied Chemical Corporation, known as "Petra." The invention however is not limited to this later material, so long as the base layer is substantially non-oriented, that is to say, has not been previously mechanically treated, to enhance rigidity and "memory."

Base layer 12 may be provided in a variety of thicknesses, depending upon the specific application for the resulting laminate, however, in the instance where an automotive laminate is contemplated, that is to be formed by injection molding as described hereinafter, base layer 12 preferably possesses a thickness ranging from about 3 mils to about 8 mils, and more specifically made be utilized at a thickness of 5 mils.

Base layer 12 is provided on both of its surfaces with tightly adherent, reflective metal coatings 14 and 16. While metal coatings 14 and 16 may be applied by a variety of well recognized techniques, it is preferable in the present invention that metal coatings 14 and 16 be applied by vapor deposition. The techniques of vapor deposition, particularly as utilized in connection with the preparation of aluminized polyester films, are well known, and are described, for example, in the Modern Plastics Encyclopedia (1970–1971), at pages 710 and following. For example, in the instance where aluminum is to be vapor deposited upon base layer 12, the aluminum (99+% pure) is held in a heated crucible in the form of pellets or the like, and is thereafter vaporized in a high vacuum chamber by resistance or induction heating. Preferably, base layer 12 comprises a continuous film, the running length of which is passed through the chamber so that one surface of the film is exposed to contact with the vaporized metal at a running rate sufficient to deposit a uniform layer of the metal onto the film, to a thickness of from 100 to 200 Angstroms. Simultaneously, the opposite side of the film may be subjected to cooling by contact with a cooling cylinder, to effect the condensation of the aluminum on the metallized surface. Both of the metal coatings 14 and 16 may be prepared by the foregoing method, to the thicknesses specified above, in accordance with one embodiment hereof.

The provision of metal coatings 14 and 16 on both broad surfaces of base layer 12, forms a sandwiching relationship therewith that obscures visual distortion that frequently results when base 12 is subjected to subsequent deformation by thermo forming techniques. Metal layers 14 and 16 are applied in a particular sequence, that will be discussed later on with reference to the method of the present invention.

Referring again to FIG. 1, an outer protective capping layer 18 is provided, adhesively bonded to base layer 12, against metal coating 14. The exact sequence of application of capping layer 18 will be discussed later on with respect to the present method.

Capping layer 18 is prepared from a film that is treated to resist attack to ultra-violet light, and to be receptive to adhesive bonding. In particular, capping layer 18 may receive surface treatments in a variety of ways, within the skill of the art, to provide both properties, such as, by corona discharge treatment, or by the application of known ultra-violet inhibitors and the like. In the instance where ultra-violet resistance is imparted by the application of a coating composition, a variety of ultra-violet inhibitors and stabilizers may be utilized, among them compounds containing a benzotriazole or benzophenone nucleus. These materials are well known and commercially available, and may be selected for use in accordance with the skill of the art.

Capping layer 18 itself comprises a resin having particular resistance to ultra-violet radiation, and the corresponding capability to successfully undergo a thermo-forming operation. Layer 18 may thus be prepared from a material selected from the group consisting of fluorinated vinyl-polymers, fluorinated polyolefins, and polyesters treated for resistance to ultra-violet radiation. In particular, capping layer 18 may comprise a polyvinylfluoride, generally available and manufactured by DuPont under the name "Tedlar." The capping layer 18 may range in thickness from 1 to 2 mils, as it is provided to present a uniform and protective exterior surface to laminate 10.

Capping layer 18 is adhesively bonded to metal coating 14 by a pressure and heat sensitive elastomeric adhesive coating 20. Adhesive coating 20 is resistant to attack by ultra-violet radiation and is harmless with respect to metal coating 14, and thus possesses favorable qualities lacking in the adhesives utilized in the prior art. As noted earlier, prior art adhesives tend to attack the metal layer and to cause its deterioration, and, by virtue of their instability in contact with ultra-violet light, tend to deteriorate unilaterally, and to allow delamination and other surface discontinuities to appear in the laminate over a short period of time. The adhesive coating 20 may be a composition such as a silicone resin or an appropriate acrylic polymer, and is preferably the former. In particular, the adhesive coating 20 may comprise homopolymers and copolymers of siloxane resins, such as those commercially manufactured by the General Electric Company, and others.

The compositions of adhesive coating 20, preferably contain a polymerization ccatalyst in amount that ranges from about 2% to about 6% by weight of the adhesive resin solids. The provision of the catalyst within this range is particularly advantageous, as it confers a partial cure to the adhesive that promotes improved bonding and stability of the adhesive after its application and disposition between capping layer 18 and metal coating 14, that resists distortion and resulting surface discontinuities during subsequent thermo-forming operations. One of the problems that has attended the use of various adhesives, particularly in contact with the metal layer of reflective laminates, has been the tendency of the adhesive, not only to attack the metal layer, but to undesirably migrate during subsequent thermo-forming. The present adhesive compositions neither attack the metal layer nor migrate in such manner, and permit the formation of faithfully uniform, thermo-formed products, having retained, improved brilliance and reflectivity.

A variety of polymerization catalysts may be utilized in the compositions of adhesive coating 20, among them benzoyl peroxide, substituted benzoyl peroxide, amino-substituted compounds and silicone compounds. A preferred catalyst comprises an amino-substituted silane, such as gamma aminopropyl triethoxysilane.

Adhesive coating 20 is preferably applied to the surface of capping layer 18 that is to be bonded to metal coating 14, prior to the bonding thereof. The exact procedure associated with the application of adhesive coating 20, will be discussed with reference to the method of the present invention, later on. Preferably, adhesive coating 20 is applied to a dry thickness ranging from about 0.3 mils to about 0.8 mils, and particularly may be applied to a thickness ranging from 0.35 mils to 0.4 mils.

As noted earlier, metal coatings 14 and 16 may be prepared from a variety of metals well known for imparting highly reflective corrosion and abrasion resistant surfaces. In particular, such metals may comprise chromium, alloys of chromium, nickel, nickel and chromium alloys such as Nichrome, iron, alloys of iron and chromium, stainless steel, aluminum, alloys of aluminum and others. Preferably, and as indicated earlier, the metal applied to form metal coatings 14 and 16 comprises aluminum.

Referring again to FIG. 1, laminate 10 is illustrated therein with a backing layer 22, that is laminated by conventional techniques to the free surface of coating 16. Backing layer 22 may be prepared as a sheet or the like from a variety of resins, including various polyolefins, vinyl polymers and copolymers, polycarbonates, acrylic polymers and copolymers, and other materials capable of undergoing a thermo-forming operation. In particular, backing layer 22 may be prepared from polyvinylchloride homo- and co-polymers, polyethylene, its copolymers and interpolymers, acrylonitrile-butadiene-styrene copolymers, and suitable mixtures thereof. Preferably, backing layer 22 comprises an ion-linked and modified ethylene interpoloymer, known commercially as "Surlyn."

Backing layer 22 may vary in thickness, and, for example, may have a thickness of 20 mils, when provided for thermo-forming and subsequent injection molding for exterior automotive application. In such instances, additional resinous material, either identical to or variant but compatible with the composition of backing layer 22 may be laminated to the free surface thereof, or injection molded into association therewith by processes described further, later on.

In accordance with a further embodiment of the present invention, a method for preparing the present laminates is disclosed, which comprises first applying a metal coating on one surface of base layer 12, adhesively bonding capping layer 18 to the metallized surface provided, for example, by metal coating 14, and thereafter applying a second metal coating 16 to the uncoated free surface of base layer 12. As noted above, the resulting laminate 10 may optionally include a backing layer 22 that is subsequently applied by lamination techniques known in the art, including extrusion lamination, and the like.

Figure 2:
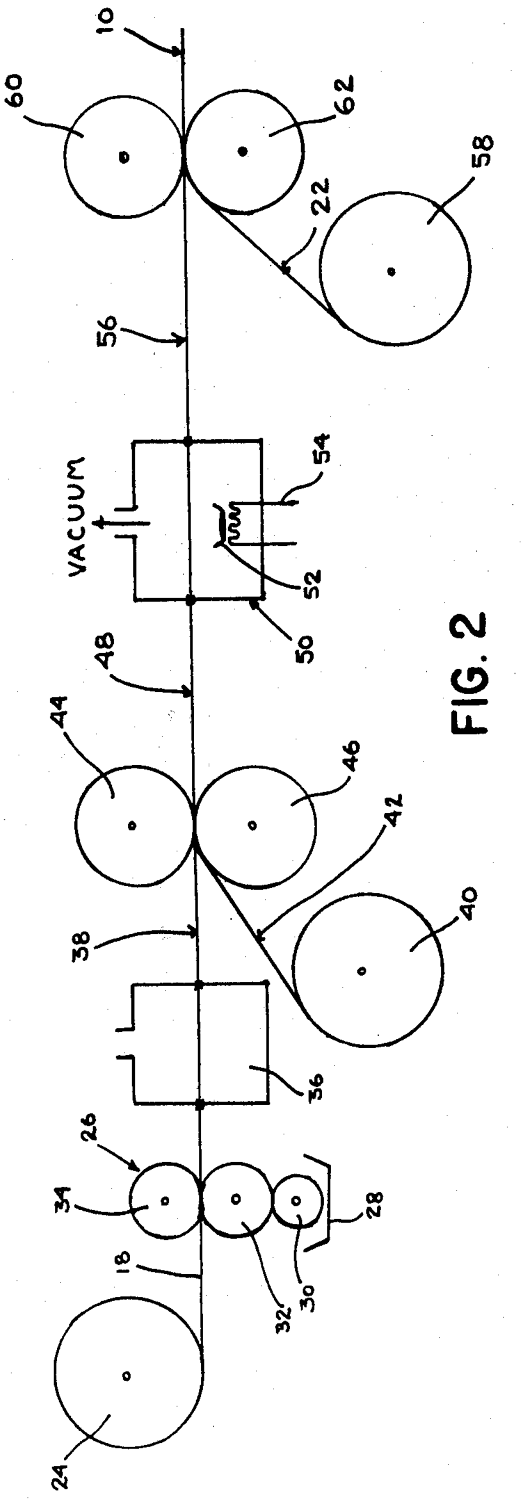
FIG. 2 is a schematic representation of the process of the present invention.

The present method will be better understood from a review of FIG. 2, comprising a schematic representation of the important manufacturing steps. Initially, the first step of the present method, not shown in FIG. 2, however, comprises the deposition of metal coating 14 on one surface of base layer 12. Preferably, base layer 12 is disposed in an extended strip of varying widths, maintained on a roll, and is continually fed through a vacuum deposition chamber, in the manner described earlier, to provide a metallized surface on one side of the film strip. After metallization is completed, the one-sided metallized strip of base layer 12 is gathered by a take up reel, not shown, and is stored in this condition for further processing in accordance herewith. The foregoing treatment is performed in accordance with well known conventional industry standards, and a specific illustration thereof is not believed to be necessary.

The next step comprises application of adhesive coating 20 to one surface of the film defining capping layer 18. As shown in FIG. 2, capping layer 18 may be paid out from a continuous roll 24 to provide a strip of material for continuous adhesive coating. Capping layer 18 then passes through an adhesive coater where a regulated amount of adhesive composition is applied to the lower surface of layer 18, such as, for example, by the schematic assembly 26 illustrated herewith. In particular, assembly 26 may comprise a trough having a quantity of adhesive compositions therein, a dip roll 30 that initially picks up the adhesive composition and relays it to a transfer roll 32, for application to the surface of capping layer 18. Proper coating pressure maybe provided by a squeeze roll 34, so that a uniform coating 20 results. Thereafter, the coated layer 18 maybe exposed to heat to dry adhesive coating 20, by passage through a drying tunnel 36, where heat is applied by forced air impinging on the wet surface. Drying may take place at a temperature on the order of about 240° F. with the coated layer 18 travelling at a speed of, for example, 70 feet per minute. Naturally, the foregoing parameters are illustrative only. The resulting composite layer 38 is now ready for further processing in accordance with the present method.

The next step in the process comprises the adhesive bonding of composite capping layer 38 with the base layer 12 previously coated on one side with a metal coating such as metal coating 14. As noted earlier, the application of coating 14 is conventional and is not illustrated schematically herein. Accordingly, a pay out reel 40 bearing the base layer 12 having the first metal coating 14 thereon, hereinafter referred to as first composite base layer 42 is brought into contact with the adhesive coated surface of composite capping layer 38, with its metal coated surface disposed thereagainst. At this point, adhesive coating 20 is dry, however, the bonding of coating 14 to coating 20 may take place under pressure alone, as coating 20, noted earlier, is pressure sensitive. Alternatively, bonding may take place under combined heat and pressure, and these latter conditions are preferred. As illustrated in FIG. 2, composite layers 38 and 42 maybe bonded by passage between pressure rollers 44 and 46, which may likewise be heated to impart both heat and pressure to the materials. For example, bonding may take place at temperatures ranging from about 140° to 150° F., and pressures ranging from about 30 to about 60 psi. Naturally, the foregoing parameters are illustrative only.

After exiting from pressure rollers 44 and 46, the resulting capped, metallized base 48 consists essentially of four discrete layers, namely, capping layer 18, adhesive coating 20, metal coating 14 and base layer 12. Metallized base 48 is thereafter coated on the free surface of base layer 12, with a second reflective metal coating 16, by feeding base 48 through a conventional vacuum metalization chamber schematically illustrated at 50. As illustrated in FIG. 2 and described earlier, a quantity of metal in pelletized form within a container such as crucible 52, is heated, such as by inductive heating means 54 to cause a fine layer of metal to deposit on the adjacent side of base 48, whereby layer 16 is formed. Layer 16 like layer 14, maybe formed to a thickness of from 100 to 200 Angstroms, and the resulting product emerging from chamber 50 will comprise the preliminary laminated structure 56 that is the essence of the present invention. Optionally, as illustrated herein and discussed earlier, a backing layer 22 disposed on a similar pay out reel 58 may be bonded to the free surface of metal coating 16, of laminated structure 56, by conventional techniques, including, as illustrated, passage through heated pressure rollers 60 and 62. While bonding by heat and pressure is illustrated schematically herein, it is to be understood, as discussed earlier, that the bonding of backing layer 22 to laminated structure 56 may be performed by other laminating techniques known in the art, within the scope of the present invention.

The product exiting from rollers 60 and 62 comprises laminate 10, illustrated in FIG. 1.

Figure 3:
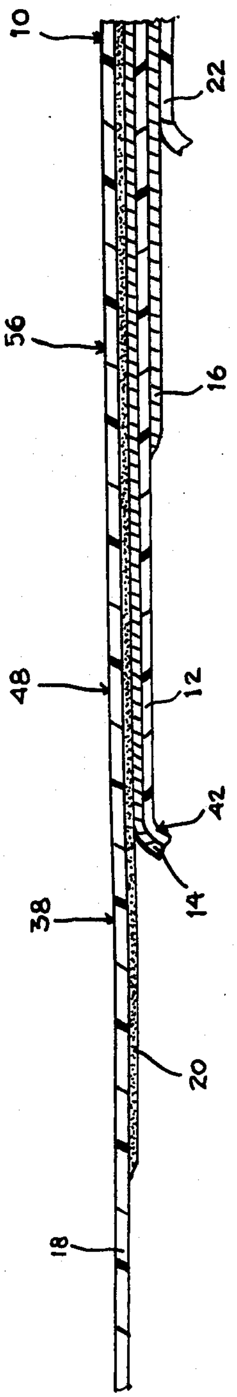
FIG. 3 is a schematic representation illustrating the state of preparation of the laminate at the various points of the process illustrated schematically in FIG. 2.

Referring briefly to FIG. 3, a schematic cross-sectional illustration of the various layers coated and otherwise combined in accordance with the present method is provided, to illustrate the manner in which the respective layers are accumulated and brought together. Thus, the left hand portion of the figure shows capping layer 18 both before and after application of adhesive coating 20, and the resulting composite capping layer 38 produced thereby. Likewise, first composite base layer 42 and its components, metal coating 14 and base layer 12 are illustrated being brought together with composite capping layer 38, to form the multi-layered capped, metallized base 48. In turn, metallized base 48 is shown after vacuum deposition of metal coating 16 on the free surface of base layer 12, to form preliminary laminated structure 56, and the final laminate 10 is shown to result from the bonding of backing layer 22 to the free surface of metal coating 16.

Figure 4:
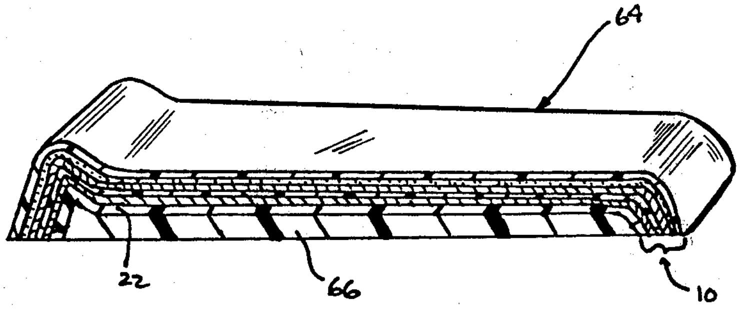
FIG. 4 is a schematic perspective illustrating a typical automotive product utilizing the laminate of the present invention.

As noted earlier, the laminate produced in accordance with the present invention is particularly useful or automotive applications, where deformation of the reflective surface is frequently necessary to form multiple contoured products for trim and bumper applications. Referring now to FIG. 4, a representative automotive end product is illustrated in schematic cross-section, prepared from laminate 10. Thus, bumper panel 64 comprises a segment of laminate 10 that has been heated and molded by thermo forming techniques, to assume the three dimensional, curved shaped illustrated. The thermo forming operation per se, does not form a part of the present invention, and is accordingly not illustrated herein.

Generally, a precut segment of laminate 10, of a size sufficient to form the contoured part illustrated in FIG. 4, is placed in a heated die cavity, where either heat and vacuum or die pressure forces the laminate 10 to assume the configuration illustrated. Thereafter, the formed laminate maybe placed in an injection molding cavity, where it serves as one of the surfaces against which a quantity of moldable resin is injected, in accordance with known techniques and parameters. After the sufficient resin has been injected, the molded article is permitted to cool and solidify. Thereafter, the male mold segment is retracted, and the excess material from the article is trimmed and removed. Finally, the injection molded article is removed from the female die, and the formation of the product such as bumper panel 64 is complete.

Referring further to FIG. 4, panel 64 is illustrated with a line of demarcation between backing layer 22 and the resinous substrate 66, to emphasize the quantity of resin that is frequently added by the final injection molding of the article. Naturally, the amount of resin utilized in the addition of substrate 66 may vary in accordance with manufacturing requirements and specific applications, and the present invention is not to be construed by way of limitation to the present illustrations.

The present laminate and associated method of preparation may be utilized for the production of a variety of products, including, without limitation, the preparation of a transfer sheet comprising a conventional carrier having a release coating disposed thereon, to which the outer surface of capping layer 18 may be releasably bound. In such instance, the transfer sheet would preferably comprise the preliminary laminated structure 56, identified in FIG. 3, which might optionally bear an appropriate adhesive coating, not shown herein, on the free metallized surface of metal coating 16. Naturally, the foregoing is illustrative of a variant embodiment and utility of the present invention.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A decorative metallized laminate having improved brilliance, reflectance and weatherability, comprising:

A. a base layer prepared from a thermo-formable resin film, both surfaces of said base layer having a thin, adherent reflective metal coating thereon;

B. an outer, protective capping layer prepared from a film having at least one surface thereof treated for receptivity to adhesive bonding, and to resist attack by ultra-violet radiation, said capping layer adhesively bonded to one of the surfaces of said base layer; and C. a pressure and heat sensitive elastomeric adhesive coating resistant to attack by ultra-violet radiation and harmless to said metal coatings, disposed intermediate the adjacent metallized surface of said base layer and said capping layer.

2. The laminate of claim 1 further including at least one thermo-formable, compatible resinous backing layer laminated to the free metallized surface of said base layer.

3. An automotive trim strip comprising the laminate of claim 2 in combination with a substrate layer in the shape of said trim strip bonded to said backing layer.

4. An automotive bumper panel comprising the laminate of claim 2 in combination with a substrate layer in the shape of said bumper panel bonded to said backing layer.

5. The laminate of claim 1 wherein said base layer comprises a non-oriented resin film prepared from a material selected from the group consisting of amorphous polyester resins, polycarbonate resins, substituted and unsubstituted vinyl polymers, and their copolymers.

6. The laminate of claim 5 wherein said film is prepared from a material selected from the group consisting of polyethylene terephthalate, acrylonitrile-butadiene-styrene, polyvinyl chloride homopolymers, and polyvinyl chloride copolymers.

7. The laminate of claim 1, 5 or 6, wherein said base layer ranges in thickness from about 3 mils to about 8 mils.

8. The laminate of claim 1, 5 or 6 wherein said metal coating is a vapor deposited layer of a material selected from the group consisting of chromium, nickel, iron, alloys thereof, aluminum, alloys of aluminum, and mixtures thereof.

9. The laminate of claim 8 wherein said metal comprises aluminum.

10. The laminate of claim 1 wherein the film comprising said capping layer is selected from the group consisting of fluorinated vinyl polymers, fluorinated polyolefins, and polyesters treated for resistance to ultraviolet radiation.

11. The laminate of claim 10 wherein said capping layer comprises polyvinyl fluoride.

12. The laminate of claim 1, 10 or 11 wherein said capping layer has a thickness of from about 1 mil to about 2 mils.

13. The laminate of claim 1 wherein said adhesive coating contains a catalyst in an amount ranging from about 2% to about 6% based on the solid content of said adhesive coating.

14. The laminate of claim 13 wherein said adhesive coating comprises a material selected from the group consisting of silicone resins and acrylic resins.

15. The laminate of claim 14 wherein said silicone resins are selected from the group consisting of siloxane homopolymers and copolymers, and mixtures thereof.

16. The laminate of claim 15 wherein said catalyst is selected from benzoyl peroxide, substituted benzoyl peroxide, amino-containing compounds, silicone compounds, and mixtures thereof.

17. The laminate of claim 16 wherein said catalyst comprises an amino-substituted silane.

18. The laminate of claim 1, 13, 16 or 17 wherein said adhesive coating is present at a dry thickness of from about 0.3 mil to about 0.8 mil.

* * * * *